US010019532B2

(12) United States Patent
Dufour et al.

(10) Patent No.: US 10,019,532 B2
(45) Date of Patent: Jul. 10, 2018

(54) SYSTEMS, DEVICES, AND/OR METHODS FOR MANAGING MESSAGES (75) Inventors: Robert M. Dufour, Richmond, VA (US); Ram Dasari, Midlothian, VA (US); Steven John Metsker, Richmond, VA (US); Scott Harris, legal representative, Woodbine, MD (US)

(73) Assignee: Fusion Company, Richmond, VA (US)

( * ) Notice: Subject to any disclaimer, the term of this patent is extended or adjusted under 35 U.S.C. 154(b) by 1167 days.

(21) Appl. No.: 12/743,914

(22) PCT Filed: Jan. 15, 2008

(86) PCT No.: PCT/US2008/051030
§ 371 (c)(1),
(2), (4) Date: Feb. 15, 2011

(87) PCT Pub. No.: WO2009/091392
PCT Pub. Date: Jul. 23, 2009

(65) Prior Publication Data
US 2011/0179346 A1 Jul. 21, 2011

(51) Int. Cl.
*G06F 17/30* (2006.01)
*G06Q 30/02* (2012.01)

(52) U.S. Cl.
CPC ... *G06F 17/30905* (2013.01); *G06Q 30/0251* (2013.01); *G06Q 30/0253* (2013.01)

(58) Field of Classification Search
CPC .. G06F 17/2247; G06F 17/211; G06F 17/227; G06F 17/218; G06F 17/24; G06F 17/30905

(Continued)

(56) References Cited

U.S. PATENT DOCUMENTS 6,574,607 B1 6/2003 Carter
2003/0061569 A1* 3/2003 Aoki ........................... 715/517
(Continued)

FOREIGN PATENT DOCUMENTS

JP 2002150138 A 5/2002
JP 2004185456 7/2004
(Continued)

OTHER PUBLICATIONS

Back, "Semantically Supported Media Services with User Participation—Report on the RISE project", Jan. 1, 2006, 102 pages, VTT Technical Research Centre of Finland, Helsinki Institute for Information Technology (HIIT).

(Continued)

*Primary Examiner* — Scott Baderman
*Assistant Examiner* — Seung Jung
(74) *Attorney, Agent, or Firm* — Michael Haynes PLC; Michael N. Haynes (57) ABSTRACT

Certain exemplary embodiments can provide a method comprising automatically rendering a message to a webpage user, the message created by a webpage operator via an automatic merger of a customized message content that corresponds to a message-generator-selected message identifier with a message template that corresponds to a message-generator-selected message template identifier, the message-generator-selected message identifier and the message-generator-selected message template identifier provided by the message generator to the webpage operator responsive to receipt of data gathered from the webpage user by the webpage operator.

22 Claims, 6 Drawing Sheets

(58) Field of Classification Search
USPC .................................. 715/231, 233, 234, 235
See application file for complete search history.

(56) References Cited

U.S. PATENT DOCUMENTS

| | | | |
|---|---|---|---|
| 2005/0204281 A1* | 9/2005 | Choate | G06F 17/2247 715/234 |
| 2006/0122884 A1* | 6/2006 | Graham et al. | 705/14 |
| 2007/0288309 A1 | 12/2007 | Haberman | |
| 2008/0133685 A1* | 6/2008 | Boss et al. | 709/206 |
| 2008/0141132 A1* | 6/2008 | Tsai | 715/716 |
| 2008/0270398 A1* | 10/2008 | Landau et al. | 707/6 |
| 2009/0150262 A1* | 6/2009 | Mizhen | 705/27 |
| 2009/0265466 A1* | 10/2009 | Yoshikawa | 709/226 |

FOREIGN PATENT DOCUMENTS

| | | |
|---|---|---|
| JP | 2007096723 | 4/2007 |
| WO | WO2006133364 | 12/2006 |

OTHER PUBLICATIONS

Monberg, "Introduction to XSLT", Mar. 8, 2002, 17 pages, TechRepublic.com.

\* cited by examiner

Recommended: Protect Your Trip

1000

Protect your investment with Access America. Coverage is available for a non-refundable airline ticket up to $3,000. See Terms and Conditions.

Yes, add insurance for $650.00  How was this Calculated?

No, thank you.

Satisfaction Guaranteed: Receive a refund on your premium within 10 days of purchase if you decide to cancel your coverage and you have not filed a claim or departed on your trip

SYSTEMS, DEVICES, AND/OR METHODS FOR MANAGING MESSAGES

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

- a—at least one.
- accord—consistent.
- according—pursuant to and/or consistent with.
- activity—an action, act, deed, function, step, and/or process and/or a portion thereof
- adapted—suitable, fit, and/or capable of performing a specified function.
- and/or—either in conjunction with or in alternative to.
- animation—humanly visible and varying graphics.
- apparatus—an appliance or device for a particular purpose
- associate—to join, connect together, and/or relate.
- audio—humanly audible sound.
- automatic—performed via an information device in a manner essentially independent of influence and/or control by a user.
- automatically—acting and/or operating in a manner essentially independent of external human influence and/or control. For example, an automatic light switch can turn on upon "seeing" a person in its view, without the person manually operating the light switch.
- based—being derived from.
- can—is capable of, in at least some embodiments.
- cause—to produce an effect.
- circuit—an electrically conductive pathway and/or a communications connection established across two or more switching devices comprised by a network and between corresponding end systems connected to, but not comprised by the network.
- comprises—includes, but is not limited to, what follows.
- comprising—including but not limited to, what follows.
- configure—to make suitable or fit for a specific use or situation.
- content—text.
- convert—to transform, adapt, and/or change.
- correspond—to be related, associated, accompanying, similar in purpose and/or position, conforming in every respect, and/or equivalent and/or agreeing in amount, quantity, magnitude, quality, and/or degree.
- corresponding—related, associated, accompanying, similar in purpose and/or position, conforming in every respect, and/or equivalent and/or agreeing in amount, quantity, magnitude, quality, and/or degree.
- create—to make, form, produce, generate, bring into being, and/or cause to exist.
- customer—a potential customer who may purchase the product advertised on the partner's web site (e.g., a traveler wishing to purchase insurance)
- customer-matched advertisement—a combination of a product identifier and/or description and its respective message content and price, presented according to a selected template to market the product to the partner's customer. The sponsor can determine the message content for the customer-matched advertisement based on data entered by the partner's customer. The sponsor can apply an algorithm and/or other sponsor-supplied business rules to determine the selected message content and/or template for the customer-matched advertisement.
- customized—unique.
- data—information represented in a form suitable for processing by an information device.
- data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.
- define—to establish the outline, form, or structure of
- determine—to obtain, calculate, decide, deduce, and/or ascertain.
- determined—found and/or decided upon.
- device—a machine, manufacture, and/or collection thereof
- each—every one of a group considered individually.
- embodiment—an implementation.
- exemplary—serving as a model.
- format—(v) to set the arrangement and/or structure of data for storage or display.
- from—used to indicate a source.
- further—in addition.
- gather—to collect, obtain, and/or receive.
- generate—to create, produce, give rise to, and/or bring into existence.
- haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identifier—a group of symbols that are unique to a particular entity, object, activity, service, relationship, characteristic, information item, and/or document. An identifier can be human and/or machine readable and/or understandable, such as for example, a number, alphanumeric string, code, bar code, RFID, etc.

identify—to specify, recognize, detect, and/or establish the identity, origin, nature, and/or definitive characteristics of.

image—an at least two-dimensional representation of an entity and/or phenomenon.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

merge—to combine, blend, and/or unite into a single entity.

message—a combination of information comprising a unique message ID, a message tag, and message text, used for advertising a product to a partner's customer. Message text can, but typically does not, include images, animation, audio, and/or video, etc. Message templates, however, can contain images, animation, audio, and/or video, etc. Each message typically includes a tag, such as HEADER or INTRO, that lets a message template determine where the message belongs in an advertisement. Each message text can be reviewed and/or approved by the partner and placed on the partner's web site where it can be displayed to the partner's customer when a web page is viewed by that customer. Via the message ID, the sponsor can maintain a reference to all messages stored on the partner's web server, but the partner can change the content of the message (e.g., the message text) without approval from the sponsor. That is, the message ID and the message text can be supplied by the sponsor to the partner. The partner can be free to change the message text but not the message ID. An exemplary message pack (table) containing exemplary messages (rows) is shown below:

| Message ID | Message Text |
| --- | --- |
| 400000 | "Recommended: Protect Your Trip" |
| 400001 | "Protect your investment with Access America. Coverage is available for a non-refundable airline ticket up to $3,000." |
| 400002d | "See Terms and Conditions" |
| 400007 | "Satisfaction Guaranteed: Receive a refund on your premium within 10 days of purchase if you decide to cancel your coverage and you have not filed a claim or departed on your trip" |
| 400003 | "Yes, add insurance for" |
| 400004 | "Price" |
| 400005d | "How was this Calculated?" |
| 400006 | "No, thank you." | message generator—an entity that provides suggested messages and corresponding message identifiers, as well as message templates and corresponding message template identifiers, to a webpage operator.

message template—a form, typically developed by the sponsor and approved for use by the partner, adapted for defining the design, formatting, etc. one or more messages advertising a product offered by the sponsor. A message template can determine where messages appear in an advertisement, based on the tags of the messages and the order in which the message tags appear in a Quote Pack. At runtime, message tags can be referenced within the Quote Pack to a partner-approved message text to produce a product advertisement for display on the partner's web site. The quote pack can include an indication of which message template to use. The message template can determine the placement of the messages, and may determine design, formatting, coloring, and/or emphasis of the messages.

method—a process, procedure, and/or collection of related activities for accomplishing something.

modification—an alternation, change, and/or adjustment to a content of an electronic file.

modify—to change, cause to change, edit, alter, replace, delete, and/or correct.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

packet—a discrete instance of communication.

partner—a party who is displaying advertisements on a web page (e.g., Delta or Continental in the case of Elvia).

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

product—one or more goods and/or services.

project—to calculate, estimate, or predict.

provide—to furnish, supply, give, convey, send, and/or make available.

quote pack—a runtime response package describing and/or identifying the product offered, the message template, and/or the messages that should be used to advertise the product. The Quote Pack can be created dynamically by the sponsor in response to a quote request from the partner and/or partner's customer. The Quote Pack can be the input into the weaving process, which can be performed on the partner's web server, before rendering the advertisement to the partner's customer.

receive—to gather, take, acquire, obtain, accept, get, and/or have bestowed upon.

recommend—to suggest, praise, commend, and/or endorse.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

repeatedly—again and again; repetitively.

request—(v.) to express a need and/or desire for; to inquire and/or ask for. (n.) that which communicates an expression of desire and/or that which is asked for.

responsive—reacting to an influence and/or impetus.

result—an outcome and/or consequence of a particular action, operation, and/or course.

select—to make a choice or selection from alternatives.

selected—a chosen item.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asychronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

sponsor—a party generating the advertising content for their product (e.g., Elvia for travel insurance), that content to be displayed on the partner's web page.

store—to place, hold, and/or retain data, typically in a memory.

subplurality—a subset.

substantially—to a great extent or degree.

suggested content—text that will be used if the webpage operator specifies no overriding text.

system—a collection of devices, machines, articles of manufacture, and/or processes, the collection designed to perform one or more practical, concrete, tangible, and useful functions.

tag—(n) a piece of text that describes the semantics, structure, and/or format of a unit of data (element) in HTML, XML, and/or other markup language; (v) to label, describe, identify, and/or classify.

template—an electronic file with a predesigned, customized format and structure, ready to be completed with text.

transmit—to send as a signal, provide, furnish, and/or supply.

user—a person, organization, process, device, program, protocol, and/or system that uses a device, system, process, and/or service.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

video—humanly visible and varying images.

weaving—a process via which, at runtime, a partner can initiate a transaction by sending a request for an offer to a sponsor. The sponsor can return a customer-matched Quote Pack to the partner, who can merge together the product, message, and/or message template identified in the Quote Pack to produce a dynamic advertisement for the customer.

webpage operator—an entity that controls a server adapted to provide, via Hypertext Transport Protocol, a message, document, entry screen, and/or information that is identified via a specific Uniform Resource Locator.

wherein—in regard to which; and; and/or in addition to.

DETAILED DESCRIPTION

Certain exemplary embodiments can provide a method comprising automatically rendering a message to a webpage user, the message created by a webpage operator via an automatic merger of a customized message content that corresponds to a message-generator-selected message identifier with a message template that corresponds to a message-generator-selected message template identifier, the message-generator-selected message identifier and the message-generator-selected message template identifier provided by the message generator to the webpage operator responsive to receipt of data gathered from the webpage user by the webpage operator.

Certain exemplary embodiments can provide a method, herein called "weaving", that can allow two parties (partner and sponsor) to agree on parameters for Internet-based advertisements without agreeing on specifics about each advertisement that appears on the partner's web site (which could number in the thousands). Weaving can allow each party to control specific parameters about the advertisement that matter most to them.

Via certain exemplary embodiments, the partner can pre-approve all advertising content by placing the content in a special location on the partner's web server. When a partner's web page is viewed on the Internet, the sponsor can supply the customer-matched advertisement based on a proprietary algorithm, but instead of sending the partner the advertisement containing content, the sponsor can send a reference to the customer-matched template and the customer-matched message to use for each product advertised on the partner's web site. As the page is rendered dynamically in the partner's web server, the actual content for the advertisement can be chosen from the pre-approved content on the partner's web site.

Via certain exemplary embodiments, the partner can pre-approve the specific advertisement message text elements that might appear to their customers and the advertisement's location on the web page. This can be important because partners can be extremely reluctant to delegate control to an outside party (sponsor) over the content (and possibly design) of advertisements on the partner's web site. Partners can spend lots of resources ensuring their customers get a consistent message and the customer's experience on the partner's web site is pleasant. Allowing an outside party to control critical pieces like the advertising message content (and possibly design) (including the ability to make changes without the partner's approval) can be viewed as risky because it can give up too much control of the customer's experience to an outside party.

Written from the perspective of the partner, weaving can help answer the question: "how do we delegate the appropriate permissions to an outside party (sponsor) to generate the "customer matched" advertisement based on their expertise while ensuring we retain full control over the advertisement messages and placement presented to our customers?"

Via certain exemplary embodiments, the sponsor can control a proprietary algorithm that can create a "customer matched" advertisement based on input parameters from the partner's customer, and/or which message template and/or message tag the partner uses when rendering a specific advertisement. The sponsor can spend lots of resources researching, testing, and/or refining the set of product and message text combinations that have a substantial and/or the greatest chance for generating a sale for the sponsor. As experts in this area, they often want to ensure that each opportunity with a customer is maximized, thus they often want to determine the optimal selection of products and message presented to the customer in order to maximize sales.

Written from the perspective of the sponsor, weaving can help answer: "how do we dynamically create a customer matched advertisement for our partners and their customers that yields strong and/or the most sales (based on our expertise with what products and messages work well and/or the best) while allowing our partners to pre-approve the content elements (and possibly design) of the advertisement on their web page?"

The weaving process can strike a balance between these competing needs such that both parties can be ensured that a customer-matched advertisement appears to the partner's customers in language approved by the partner.

Via certain exemplary embodiments, the partner can create an advertisement from pre-approved component parts. This can guarantee that the partner has pre-approved all textual content (from messages) and potentially all design (e.g., layout, fonts, look and feel, etc. (from message templates)). Through a business process, the sponsor and partner can agree in advance which messages and templates are acceptable. The sponsor and partner can collaboratively introduce new messages and/or new message templates at any time, without requiring any change in the software technology in use by either the partner or sponsor. This can avoid either sponsor or partner having to wait for development resources when new and/or revised message text and/or messages templates are desired. Certain exemplary embodiments can utilize an information exchange tool that is stable, open source, and/or standard, such as XSLT.

What follows describes the logic of exemplary XSLT code of an exemplary message template, which specifies how to process the information in an exemplary Quote Pack, and that emits (outputs) HTML text designed to become part of an exemplary web page.

The XSLT code can contain rules that, when run against an XML document, result in a piece of HTML text designed to become part of the web page. The original XML is typically unchanged, and the HTML is typically generated ("printed") as output from the XSLT transformation, although results of the transformation can be provided in any graphics language, print language, video language, and/or any other media language that can be rendered via webpage, graphic, print, video, and/or any other media.

The XSLT rules can use pattern matching. That is, they can look for specific sections of the source XML document, those sections marked by start and end tags, and print the output HTML based on the contents of those marked sections.

The following describes how this transformation can work on an exemplary Quote Pack.

Initial Rule: Find an element in the quote pack marked "HeavyQuotePackData"
   (this section will have a start tag of <HeavyQuotePackData> and an end tag of </HeavyQuotePackData>)
      Print starting div tag (<div>; div is short for division and is used to organize sections of HTML)
      Run all other rules against any element marked "TemplateMessageList"
      (this section will have a start tag of <TemplateMessageList> and an end tag of </Template MessageList>)
      Run all other rules against any element marked "HeavyQuotes"
      (this section will have a start tag of <HeavyQuotes> and an end tag of </HeavyQuotes>)
      Run all other rules against any element marked "TemplateMessageList/HeavierMessageData"
      (this indicates a section marked HeavierMessageData that is inside of a section marked TemplateMessageList)
   Print ending div tag (</div>)

Rule: Find an element in the quote pack marked "TemplateMessageList"
   (this section will have a start tag of <TemplateMessageList> and an end tag of </TemplateMessageList>)
   For each contained element marked "HeavierMessageData"
   (this section will have a start tag of <HeavierMessageData> and an end tag of </HeavierMessageData>)
   If this element's "tag" has a value of "HEADER"
      Print starting header tag (<h2>)
         Print the value of the "Text" element
         Print ending header tag (</h2>)
         Print line break tag (<br/>)
            Print starting paragraph tag (<p>)
   For each element marked "HeavierMessageData"
   If this element's "tag" has a value of "INTRO"
   If this element has a non-empty "Url" element
      Print an anchor tag with a link to that URL with the element's Text value as the hypertext ("clickable")
   Otherwise
         Print starting label tag (<label>)
         Print this element's "Text" element
         Print ending label tag (</label>)
         Print ending paragraph tag (</p>)

Rule: Find an element in the quote pack marked "HeavyQuotes"
   Run all rules against elements marked "HeavyQuoteData"

Rule: Find an element in the quote pack marked "HeavyQuoteData"
   Print starting paragraph tag (<p>)
   Print radio button tag with the name attribute set to "RadioGroup" and the id attribute set to the text of the contained element marked "ProductID". (<input type="radio" name="RadioGroup" id="text of element marked ProductID"/>)
   For each element marked "Messages/HeavierMessageData"(these sections
   If this element's "Tag" value is "OPTION"
      If this element has a non-empty "Url" element
         Print an anchor tag with a link to that URL with the element's Text value as the hypertext ("clickable")

Otherwise
    Print starting label tag (<label>)
    Print this element's "Text" element
    Print ending label tag (</label>)
    Print ending paragraph tag (</p>)
If this element's "Tag" has a value of "PRICE"
    Print starting strong tag (<strong>; indicates text should be bold)
    Print the value of the current element's "Text" field
    Print ending strong tag (</strong>)
    Print ending paragraph tag (</p>)
Rule: Find an element in the quote pack marked "TemplateMessageList/HeavierMessageData"
    If this element's "Tag" has a value of "FOOTER"
Print starting paragraph tag (<p>)
Print starting label tag (<label>)
If this element has a non-empty "Url" element
    Print an anchor tag with a link to that URL with the element's Text value as the hypertext ("clickable")
Otherwise
    Print this element's "Text" element
    Print ending label tag (</label>)
    Print ending paragraph tag (</p>)

Figure 1:
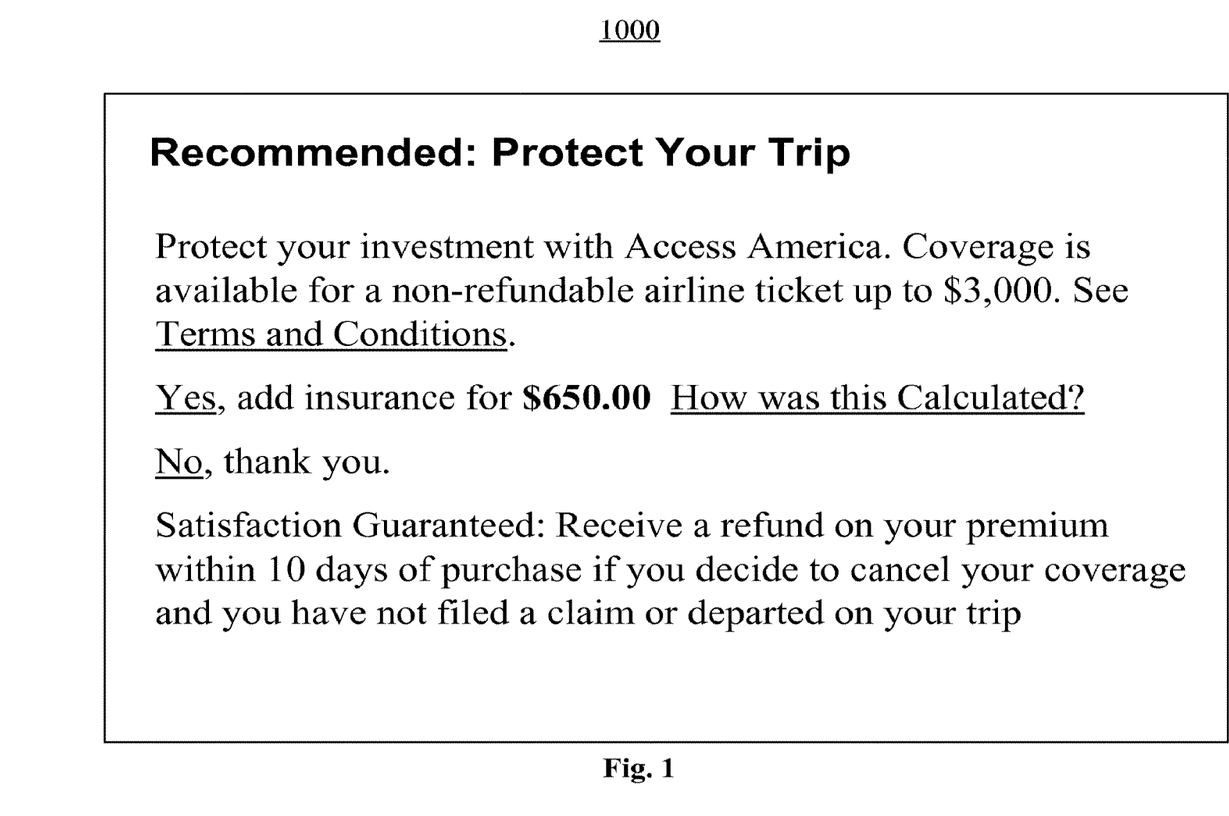
FIG. 1 is an illustration of an exemplary embodiment of an advertisement.

FIG. 1 illustrates an exemplary embodiment of an advertisement 1000 generated based on a weaving of an exemplary template and exemplary messages that were identified in an exemplary Quote Pack. That is, when the partner runs the XSLT transform against a Quote Pack, the emitted HTML can result in a customer-matched advertisement, such as illustrated in FIG. 1.

Note that the message template can specify attributes such as radio button design, background color, link button to purchase, link to view details, and where to place "HEADER" and "FOOTER" messages, etc. The message template can specify the "look" of the advertisement and how it will appear to the end customer. There can be multiple message templates, each one with a different "look". Each message template can have a unique identifier.

An exemplary embodiment of the weaving process can start when a partner sends the following exemplary customer-provided information to the sponsor. The exemplary information can come from the partner's customer who has input this data on the partner's web site. The customer's data can be sent to the sponsor in XML format:

| Passenger Name Record Fields | Example Customer Data |
|---|---|
| Partner | Airlines |
| Booking Date | Nov. 11, 2007 |
| Travel Start Date | Dec. 21, 2007 |
| Travel End Date | Dec. 28, 2007 |
| Zip Code | 23220 |
| Home Country | USA |
| Trip Origination | DCA |
| Trip Destination | LAX |
| Number of Passengers | 2 |
| Purchase Segments | Air |
| Class of Service | Coach |
| Cost of Trip by Segment | $1,230 |
| Customer ID | 983937221833 |

This data can be received by the sponsor who can run an algorithm to determine products the sponsor desires to offer this customer based on the customer data provided. The sponsor's offer can be returned to the partner in the form of a Quote Pack (table) containing, in this exemplary case, two products (rows):

| Template Indicator | TI-001 |
|---|---|
| Message Id | Message Tag |
| Offer Pack Messages | |
| 400000 | HEADER |
| 400001 | INTRO |
| 400002d | INTRO |
| 400007 | FOOTER |
| Offer Messages for the "Yes" Offer | |
| 400003 | OPTION |
| 400004 | PRICE |
| 400005d | OPTION |
| Offer Messages for the "No" Offer | |
| 400006 | OPTION |

As described above, during initial setup, the sponsor can provide a suggested configuration of messages for the partner to utilize. The partner can accept the suggested messages (and/or message text) to use and/or can customize desired messages for their customers. The sponsor can provide a message template to use for transforming one or more messages into an advertisement. Depending on how their relationship is negotiated, in some cases, the partner may edit desired message templates, and in other cases, only the sponsor may edit any message template. In any event, the partner can approve these messages and/or templates by uploading them to the partner's web server(s).

During runtime, the partner can send a request via the Internet to the sponsor with data gathered from the customer. The sponsor in near real-time (<2.5 seconds) can determine the customer-matched product for the partner based on a proprietary algorithm. The sponsor can return a response to the partner in the form of a Quote Pack. On the partner's web server, the Quote Pack can be woven together with the identified partner-approved message and message template to create an HTML-coded Internet advertisement for rendering via the partner's web site.

Certain exemplary embodiments can allow the partner to pre-approve the advertisement's message content displayed to their customers while delegating the decision about which product to advertise to the sponsor (who can use their customer match algorithm to determine the product, message, and template for the advertisement). Conversely, the sponsor can control which product is displayed on the partner's web site and can influence (but not completely control) the message content (and/or design of that content) used to market the product to the customer. This can be done by referencing, in the Quote Pack, a specific message ID (and/or message template ID) to use when creating the advertisement. Using this process can allow each party to retain control of information that is important to them while delegating control of the information most important to the other party. It can enable each party to unilaterally make changes to the parts they control without the consent of the other party.

Figure 2:
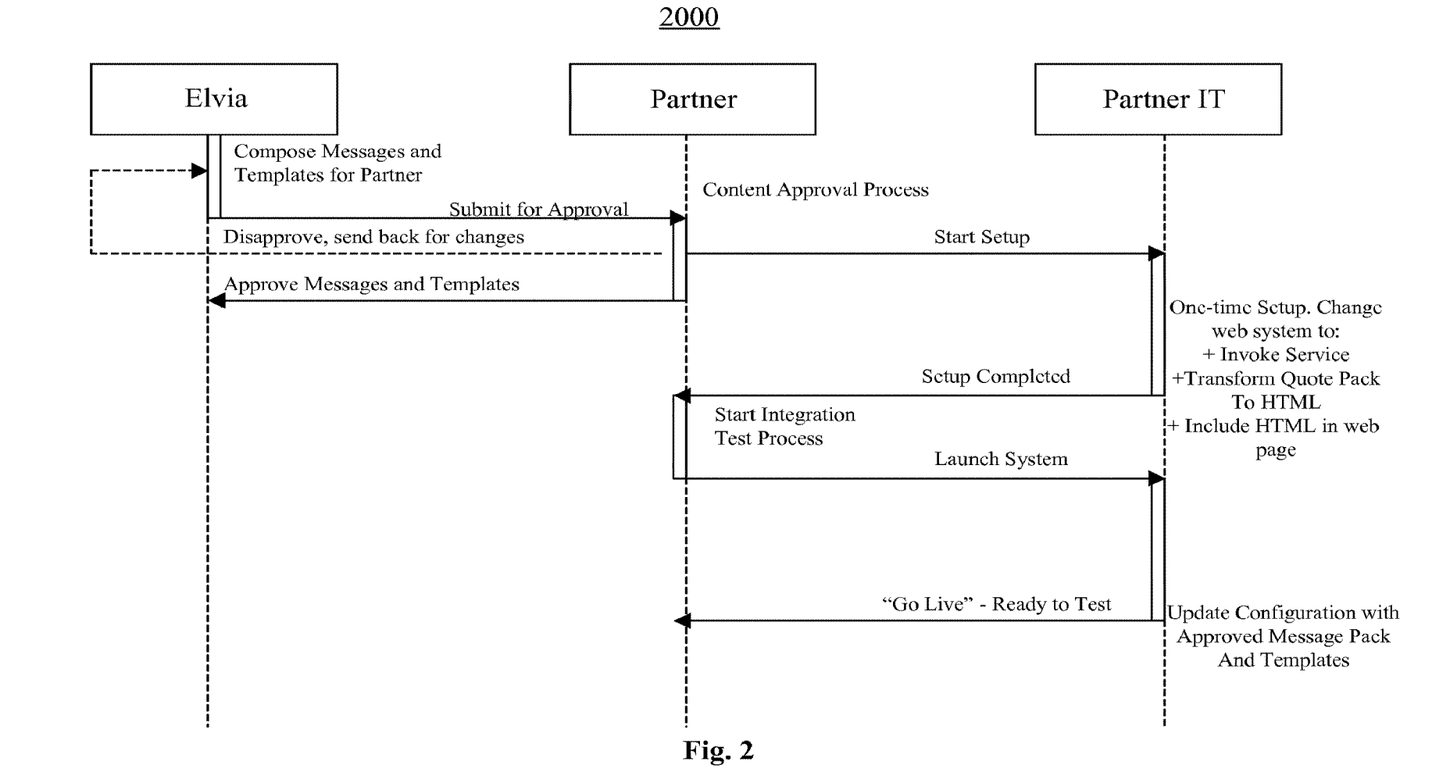
FIG. 2 is a sequence diagram of an exemplary initial setup method.
Figure 3:
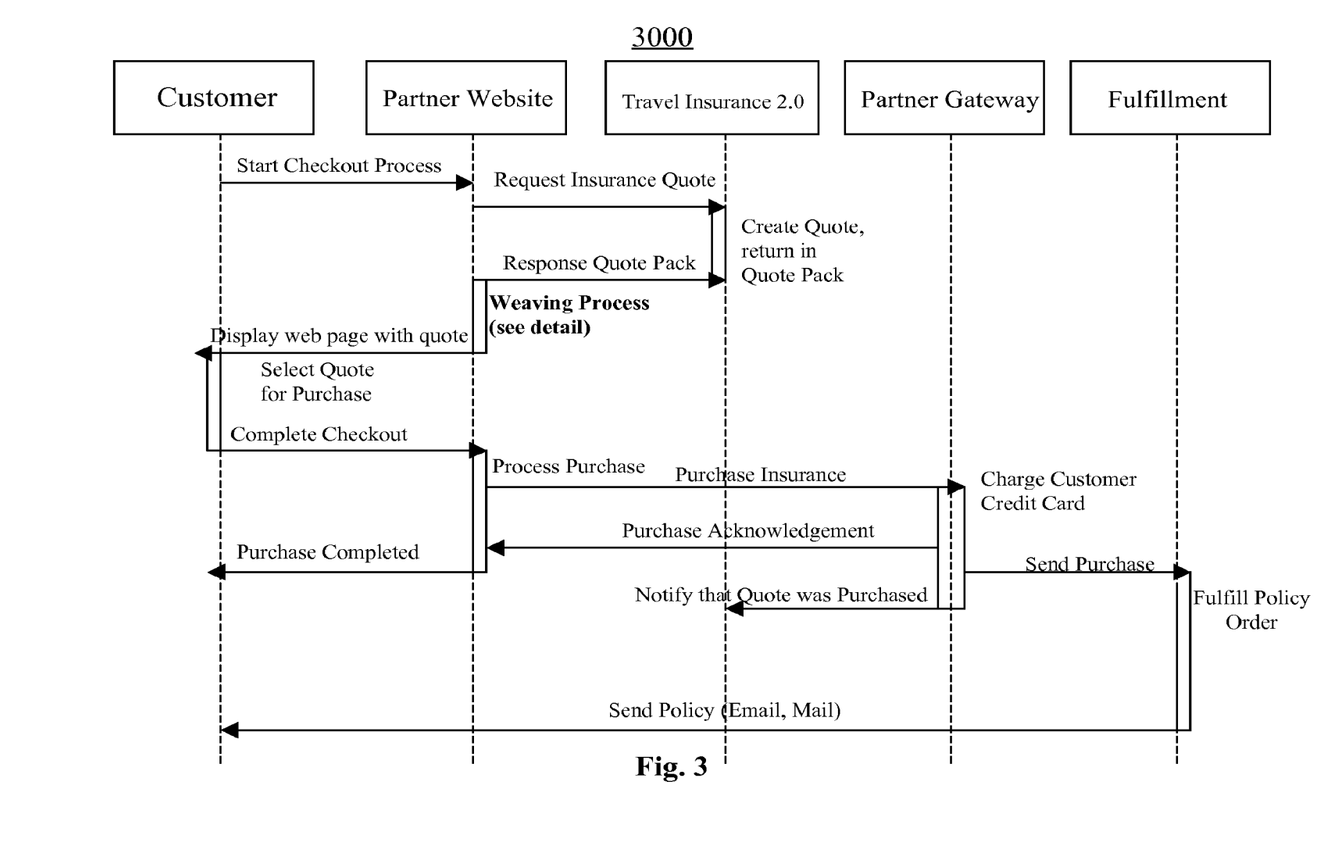
FIG. 3 is a sequence diagram of an exemplary runtime method.

The weaving processes can be considered in two parts: initial setup and runtime. FIG. 2 is a sequence diagram of an exemplary initial setup method 2000, which can be preconditioned on obtaining a signed contract identifying appropriate terms and conditions. FIG. 3 is a sequence diagram of an exemplary runtime method 3000, which can be preconditioned on completing the set-up process and/or integration testing.

FIG. 2 and FIG. 3 show how the parties (sponsor and partner) can collaborate to provide a customer-matched advertisement (one that the sponsor believes will increase the likelihood of a product sale) that appears to the partner's customers in language approved and controlled by the partner.

Certain exemplary embodiments can be used with a product (such as the Travel Insurance 2.0 product from Elvia (a sponsor) of Richmond, Va.), to supply advertisements to the sponsor's customers (e.g., partners) for the sponsor's products. Certain exemplary embodiments can allow the partners to display advertisements to their customers for products provided by the sponsor.

In certain exemplary embodiments, the sponsor can implement the initial setup process by providing the initial message templates and/or messages (which can be customized by the partner) to the partner and ensuring that the sponsor can generate a Quote Pack in response to a request from the partner's web server.

The partner can implement the initial setup process by reviewing and uploading the approved message content and/or templates to their web site and configuring their web servers to send requests to the sponsor's service at the appropriate time during the customer's checkout.

The partner can implement the runtime process by having the industry-standard Extensible Stylesheet Language Transformation (XSLT) technology installed and configured to weave together sponsor-approved message templates and messages provided in Quote Packs with partner-approved content and/or layouts for the advertisements. XSLT can transform the Extensible Markup Language (XML) Quote Packs and message templates into Hypertext Markup Language (HTML) code used to create, provide, transmit, and/or render web pages viewable on the Internet.

In certain exemplary embodiments, a sponsor can create an advertisement (in HTML code) containing text and/or images to advertise their products on the Internet. The sponsor can find a partner who is willing to put this advertisement on the partner's web site during for display during the partner's customer's checkout process in order to cross-sell products from the sponsor to the partner's customer. The sponsor and the partner can enter into a contract whereby the sponsor agrees to deliver a "customer-matched" advertisement to the partner's web server (for viewing on the partner's web site) in exchange for the partner getting a percentage of all revenue originating from customers of the partner who followed the instructions in the advertisement and purchased the sponsor's products.

The sponsor can manually decompose the Internet advertisement into four logical parts:
  The location of the advertisement (i.e., where it's displayed on the page). The partner and sponsor can negotiate the best placement of the advertisement within the checkout process and the partner can modify their web site to place the appropriate Internet advertisement-rendering code (supplied by the sponsor) on the appropriate page in the checkout process.
  The message content in the advertisement (e.g., what words, images, audio, video, and/or animations, etc., are displayed to market the product to the customer). The sponsor can provide a suggested set of messages to the partner where each message has a unique message ID and message content. Partners can make and/or request adjustments to the message content and when they are satisfied with the message content, they can upload messages to their web site. The partner's uploading of their modified messages to their web site can complete their approval process.
  The design of the advertisement (e.g., layout, height, width, colors, font, look and feel, etc.). The partner and sponsor can negotiate a template that specifies the design of the advertisement as it will appear on the partner's web site. The sponsor can create code, such as in the form of HTML, that can cause the advertisement to be rendered on the partner's web site per the agreed design and/or template. In some cases, the partner can be empowered to edit some and/or all aspects of the template. Note: if desired, images, audio, video, and/or animations need not be part of the message content, can be specified via the template, and/or can be partially and/or completely controlled by the partner.
  The product advertised, potentially including instructions for purchasing the product, the price of the product, available quantities of the product, available dates and/or unavailable dates for the product, actual and/or potential discounts and/or rebates available, characteristics of the product, and/or terms and/or conditions of sale, etc.

As shown in FIG. 2 and FIG. 3, the sponsor can design a process for allowing both parties to collaborate on the four parts but ultimately giving the partner control over at least the message content for the advertisement while giving the sponsor control over what products are advertised and potentially the resulting advertisement's design (such as in the form of sponsor-supplied XSLT message templates). To make the process operational, the sponsor can develop components such as:
  The sponsor can create message templates (e.g., XSLT code) that dynamically can create HTML code to render the agreed-upon Internet advertisement on the partner's web site. Each template can have a unique logical key and/or identifier so more than one type of template can be supported. The template code (e.g., XSLT code), once sent to the partner and installed and configured on the partner's web site, can be used to weave sponsor-provided Quote Pack data that identifies which "customer matched" products, messages, and/or message templates to use from XML into an HTML internet advertisement or display on the partner's web site.
  The sponsor can develop a web service that accepts as input information (e.g., in XML format) about, for example, a traveler, their trip, and/or the partner, and returns in response (e.g., in XML format), one or more advertisements for one or more products that provides the "customer match" based on customer segmentation rules, product and pricing tables, and/or historical data on which past offers generated the most sales. Data sent from the partner to the sponsor's service can include, for example: departure and/or arrival destinations (airport code and/or countries), dates and/or times of travel, number of passengers traveling, whether they are purchasing airline tickets, hotel reservation and/or renting a car, their country and/or residence, and/or partner-unique code, etc. Data returned can include, for example: the matched products, their prices and/or descriptions, the desired content to market those products (and/or a message content logical key(s) that reference that content), the desired Internet advertisement template to use (and/or a message template logical key that references that template), and/or a hyperlink to use for purchasing the products. Data sent between the sponsor and partner and/or between the partner and sponsor can be in a standard format, such as XML, that conforms to a standard format definition (e.g., XML Schema). The sponsor can create the XML Schema for both the input request (from the partner) and output response (to the partner).

The sponsor can provide the standard format definition (e.g., XML Schema), suggested messages (such as in XML code), message templates (such as in XSLT code), and/or the Internet address for invoking the service (in the form of Uniform Resource Location or URL) to the partner.

With this information, the partner can modify the checkout process on their web site to invoke the sponsor's service (URL), passing the desired customer input data (e.g., in XML format, adhering to the XML Schema specification) to the sponsor. Upon receipt of the Quote Pack response back from the sponsor (e.g., in XML format), an industry-standard XSLT engine installed on the partner's web server(s) can utilize the information contained and/or referenced in the Quote Pack to weave the identified local partner-approved message template with the local partner-approved message content to produce an Internet advertisement (e.g., HTML code) for display on the partner's web site.

Once the partner has modified their web site to integrate the sponsor-supplied messages and message templates, the partner can test their updated checkout process to ensure that customer information is sent to the sponsor at the appropriate point and the resulting internet advertisement for the "customer matched" products are displayed.

Once the initial setup process is tested, the partner can roll-out the sponsor-supplied advertisements to their customers and the runtime process (previously described) can be used for the lifetime of the sponsor-partner partnership as defined by terms in the contract between the sponsor and partner.

Figure 4:
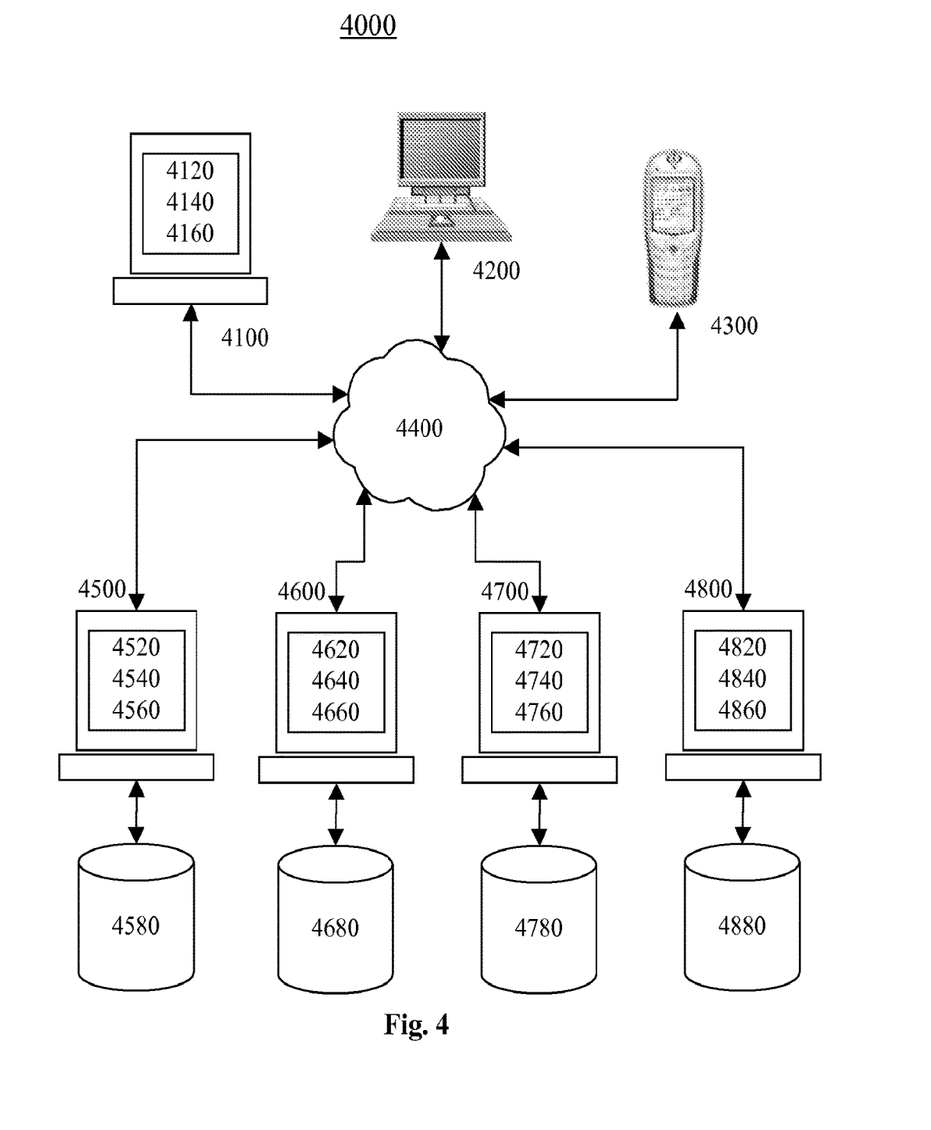
FIG. 4 is a block diagram of an exemplary embodiment of system 4000.

FIG. 4 is a block diagram of an exemplary embodiment of system 4000, which can comprise a customer information device 4100, 4200, 4300, which can run a web browser 4120 to render a web page 4140 displaying an advertisement 4160, and which can be connected to a network 4400, such as the Internet.

Also connected to network 4400 can be one or more partner information devices 4500, 4600, either of which can run a message processor 4520, 4620 and/or a web page server adapted to generate, transmit, and cause to be rendered advertisement 4140, based on message content 4540, 4640 and/or message templates 4560, 4660 stored and/or referenced in memory device 4580, 4680.

Also connected to network 4400 can be one or more sponsor information devices 4700, 4800, either of which can run customer-matched advertisement selection software 4720, 4820, which can be adapted to evaluate, select, and transmit a message content 4740, 4840 (and/or an identifier thereof) and/or a message template 4760, 4860 (and/or an identifier thereof) stored in memory device 4780, 4780 to one or more partner information device 4500, 4600.

Figure 5:
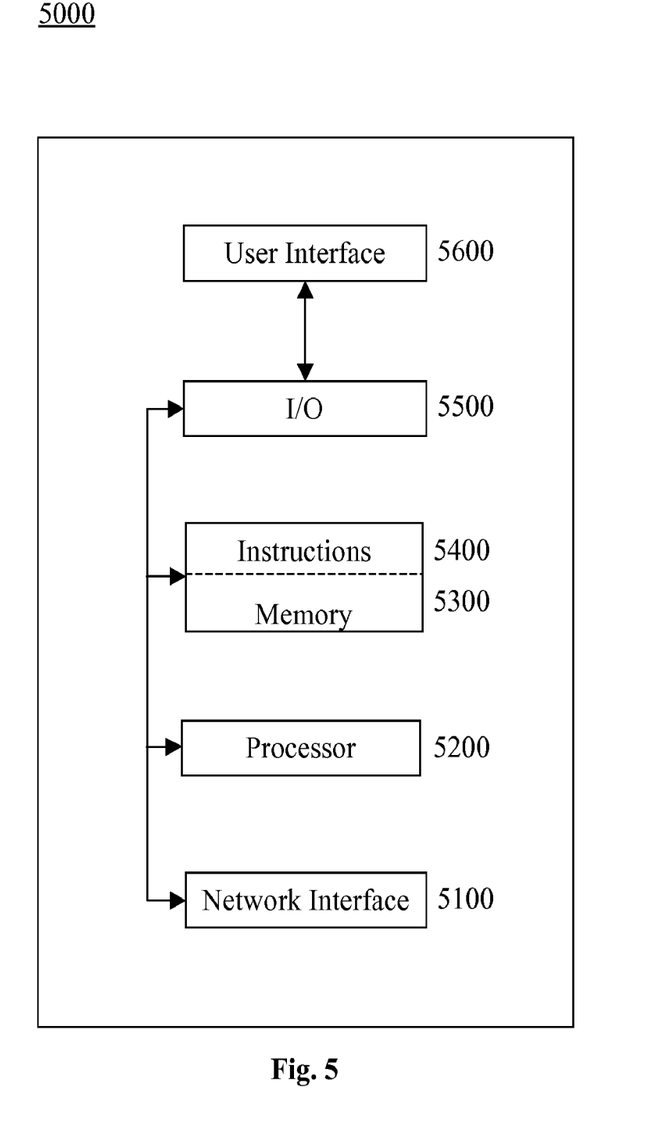
FIG. 5 is a block diagram of an exemplary embodiment of an information device 5000.

FIG. 5 is a block diagram of an exemplary embodiment of an information device 5000, which in certain operative embodiments can comprise, for example, customer information device 4100, 4200, 4300, partner information device 4500, 4600, and/or sponsor information device 4700, 4800 of FIG. 4. Information device 5000 can comprise any of numerous circuits and/or components, such as for example, one or more network interfaces 5100, one or more processors 5200, one or more memories 5300 containing instructions 5400, one or more input/output (I/O) devices 5500, and/or one or more user interfaces 5600 coupled to I/O device 5500, etc.

In certain exemplary embodiments, via one or more user interfaces 5600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Figure 6:
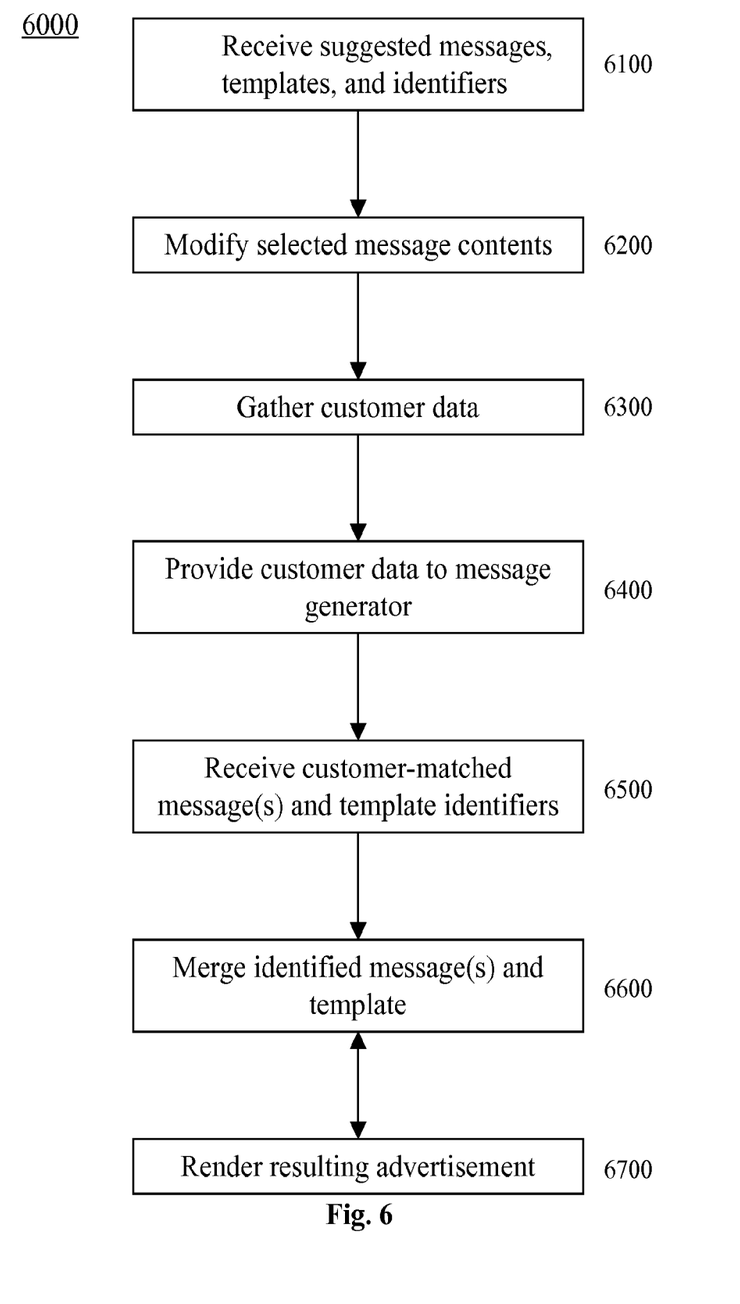
FIG. 6 is a flowchart of an exemplary embodiment of a method 6000.

FIG. 6 is a flowchart of an exemplary embodiment of a method 6000. At activity 6100, a partner (which can be considered a "webpage operator") can request, receive, and/or store one or more sponsor-generated: suggested message contents, corresponding message identifiers, message tags, message templates, and/or corresponding message template identifiers, etc. At activity 6200, the partner can modify and store a selected portion of the suggested message contents and/or a selected portion of the message templates. At activity 6300, from a customer visiting the partner's web site, the partner can gather data regarding that customer (which can be considered a "webpage user") and/or another customer, person, and/or entity. At activity 6400, the partner can provide gathered customer data to the sponsor (which can be considered a "message generator"). At activity 6500, the partner can automatically receive from the sponsor one or more customer-matched message tags, message identifiers, and/or template identifiers, those tags and/or identifiers determined by the sponsor based on the customer data and/or information regarding the partner. At activity 6600, the partner can automatically: look-up the message contents and message template(s) corresponding to the received identifiers, merge the identified message contents into the identified message template(s), potentially according to any received message tags, and/or generate a customer-matched advertisement that is formatted according to the sponsor-determined, partner-approved, and/or partner-modified message template and/or contains the sponsor-determined, partner-approved, and/or partner-modified message contents. At activity 6700, the partner can automatically: post the customer-matched advertisement to the partner's web site, transmit the customer-matched advertisement to the customer's information device, and/or cause the customer's information device and/or browser to render the customer-matched advertisement.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element, of this application or any application to claim priority hereto, is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method configured to modify an internet-based checkout process of a webpage operator to render, to a webpage user, message content of an advertisement, the message content selected by a message generator and customized by the webpage operator, the checkout process configured to sell any of a plurality of products of the webpage operator, the method comprising:

receiving, by one or more information devices of a webpage operator, from one or more information devices of a message generator, the message generator a distinct party from the webpage operator, the one or more information devices of the message generator physically distinct from the one or more information devices of the webpage operator:

a plurality of suggested message contents;

for each suggested message content from the plurality of suggested message contents, a corresponding message identifier;

a plurality of message templates; and for each message template from the plurality of message templates, a corresponding message template identifier;

modifying a selected plurality of suggested message contents from the plurality of suggested message contents to form a plurality of customized message contents;

gathering data from one or more information devices of a webpage user responsive to the webpage user initiating a checkout process for at least one product of the webpage operator;

automatically providing the data to the one or more information devices of the message generator;

automatically requesting, from the one or more information devices of the message generator, based on the data, a message-generator-selected message identifier selected from the plurality of message identifiers and a message-generator-selected message template identifier selected from the plurality of message template identifiers;

automatically receiving, from the one or more information devices of the message generator, a message tag corresponding to the message-generator-selected message identifier, and the message-generator-selected message template identifier;

in accord with the message tag, at the one or more information devices of the webpage operator, automatically merging a selected customized message content from the plurality of customized message contents, the selected customized message content corresponding to the message-generator-selected message identifier, with a selected message template from the plurality of message templates, the selected message template corresponding to the message-generator-selected message template identifier, to create a message that comprises the selected customized message content and is formatted according to the selected message template, the message tag defining where the customized message content appears in the message;

automatically modifying, via the one or more information devices of the webpage operator, the checkout process of the webpage operator to render the message to the webpage user via the one or more information devices of the webpage user, the webpage user distinct from the webpage operator and the message generator, the one or more information devices of the webpage user distinct from the one or more information devices of the webpage operator and the one or more information devices of the message generator; and responsive to the webpage user following an instruction to initiate a purchase of a product, of the message generator, that is described by the message, sending information to a fulfillment provider, the information sufficient to initiate fulfillment of the purchase, the fulfillment provider a distinct entity from the webpage operator and the webpage user.

2. A method configured to modify an internet-based checkout process of a webpage operator to render, to a webpage user, message content of an advertisement, the message content selected by a message generator and customized by the webpage operator, the checkout process configured to sell any of a plurality of products of the webpage operator, the method comprising:

responsive to the webpage user initiating the checkout process, for at least one product from the plurality of products of the webpage operator, automatically providing data obtained from one or more information devices of the webpage user to one or more information devices of the message generator;

automatically modifying the checkout process to render a message to a webpage user via one or more information devices of the webpage user, the webpage user distinct from the webpage operator and a message generator, the one or more information devices of the webpage user physically distinct from one or more information devices of a webpage operator and one or more information devices of a message generator, the checkout process configured to provide information to a fulfillment provider, the fulfillment provider a distinct entity from the webpage operator and the webpage user; and responsive to the webpage user following an instruction to initiate a purchase of a product, of the message generator, that is described by the message, the information sufficient to initiate fulfillment of the purchase, causing the information to be sent to the fulfillment provider; the message created by the one or more information devices of the webpage operator via an automatic merger of a customized message content that corresponds to a message-generator-selected message identifier with a message template that corresponds to a message-generator-selected message template identifier, a message tag corresponding to the message-generator-selected message identifier defining where the customized message content appears in the automatically-created message, the message tag provided by the message generator, the message-generator-selected message identifier and the message-generator-selected message template identifier provided by the one or more information devices of the message generator to the one or more information devices of the webpage operator responsive to receipt of data gathered from the one or more information devices of the webpage user by the one or more information devices of the webpage operator, the customized message content a result of a modification by the one or more information devices of the webpage operator of a selected suggested message content from a plurality of suggested message contents provided to the one or more information devices of the webpage operator by the one or more information devices of the message generator, the message-generator-selected message template identifier one of a plurality of message template identifiers provided to the webpage operator by the message generator, the message generator a distinct party from the webpage operator, the one or more information devices of the message generator physically distinct from the one or more information devices of the webpage operator, each of the plurality of message template identifiers corresponding to a message template provided to the webpage operator by the message generator.

3. The method of claim 2, further comprising:
receiving, by the one or more information devices of the webpage operator, from the one or more information devices of the message generator, the plurality of suggested message contents.

4. The method of claim 2, further comprising:
receiving, by the one or more information devices of the webpage operator, from the one or more information devices of the message generator, a message identifier corresponding to each suggested message content from the plurality of suggested message contents.

5. The method of claim 2, further comprising:
receiving, by the one or more information devices of the webpage operator, from the one or more information devices of the message generator, the plurality of message templates.

6. The method of claim 2, further comprising:
receiving, by the one or more information devices of the webpage operator, from the one or more information devices of the message generator, the message template identifier corresponding to each message template from the plurality of message templates.

7. The method of claim 2, further comprising:
modifying, at the one or more information devices of the webpage operator, a selected suggested message content from the plurality of suggested message contents to form the customized message content.

8. The method of claim 2, further comprising:
gathering data from the one or more information devices of the webpage user.

9. The method of claim 2, further comprising:
automatically providing the data to the one or more information devices of the message generator.

10. The method of claim 2, further comprising:
automatically requesting, from the one or more information devices of the message generator, based on the data, the message-generator-selected message identifier and the message-generator-selected message template identifier.

11. The method of claim 2, further comprising:
automatically receiving, from the one or more information devices of the message generator, the message-generator-selected message identifier, a message tag corresponding to the message-generator-selected message identifier, and the message-generator-selected message template identifier.

12. The method of claim 2, further comprising:
in accord with a message tag corresponding to the message-generator-selected message identifier, automatically merging, at the one or more information devices of the webpage operator, the customized message content that corresponds to the message-generator-selected message identifier with the message template that corresponds to the message-generator-selected message template identifier.

13. The method of claim 2, further comprising:
automatically creating the message by the one or more information devices of the webpage operator.

14. The method of claim 2, wherein:
the message template comprises an image.

15. The method of claim 2, wherein:
the message template comprises audio.

16. The method of claim 2, wherein:
the message template comprises video.

17. The method of claim 2, wherein:
the message template comprises animation.

18. The method of claim 2, wherein:
the message-generator-selected message identifier is determined responsive to the data gathered from the one or more information devices of the webpage user.

19. The method of claim 2, wherein:
the message-generator-selected message template identifier is determined responsive to the data gathered from the one or more information devices of the webpage user.

20. A non-transitory machine-readable medium comprising machine instructions configured to modify an internet-based checkout process of a webpage operator to render, to a webpage user, message content of an advertisement, the message content selected by a message generator and customized by the webpage operator, the checkout process configured to sell any of a plurality of products of the webpage operator, the instructions configured for activities comprising:
responsive to the webpage user initiating the checkout process, for at least one product from the plurality of products of the webpage operator, automatically providing data obtained from one or more information devices of the webpage user to one or more information devices of the message generator;
automatically modifying the checkout process to render a message to a webpage user via one or more information devices of the webpage user, the webpage user distinct from the webpage operator and a message generator, the one or more information devices of the webpage user physically distinct from one or more information devices of a webpage operator and one or more information devices of a message generator, the checkout process configured to provide information to a fulfillment provider, the fulfillment provider a distinct entity from the webpage operator and the webpage user; and responsive to the webpage user following an instruction to initiate a purchase of a product, of the message generator, that is described by the message, the information sufficient to initiate fulfillment of the purchase, causing the information to be sent to the fulfillment provider;

the message created by the one or more information devices of the webpage operator via an automatic merger of a customized message content that corresponds to a message-generator-selected message identifier with a message template that corresponds to a message-generator-selected message template identifier, a message tag corresponding to the message-generator-selected message identifier defining where the customized message content appears in the automatically-created message, the message tag provided by the message generator, the message-generator-selected message identifier and the message-generator-selected message template identifier provided by the one or more information devices of the message generator to the one or more information devices of the webpage operator responsive to receipt of data gathered from the one or more information devices of the webpage user by the one or more information devices of the webpage operator, the customized message content a result of a modification by the one or more information devices of the webpage operator of a selected suggested message content from a plurality of suggested message contents provided to the one or more information devices of the webpage operator by the one or more information devices of the message generator, the message-generator-selected message template identifier one of a plurality of message template identifiers provided to the webpage operator by the message generator, the message generator a distinct party from the webpage operator, the one or more information devices of the message generator physically distinct from the one or more information devices of the webpage operator, each of the plurality of message template identifiers corresponding to a message template provided to the webpage operator by the message generator.

21. A system configured to modify an internet-based checkout process of a webpage operator to render, to a webpage user, message content of an advertisement, the message content selected by a message generator and customized by the webpage operator, the checkout process configured to sell any of a plurality of products of the webpage operator, the system comprising:

a message processing circuit configured to:

responsive to the webpage user initiating the checkout process, for at least one product from the plurality of products of the webpage operator, automatically providing data obtained from one or more information devices of the webpage user to one or more information devices of the message generator;

automatically modify the checkout process to render a message to a webpage user via one or more information devices of the webpage user, the webpage user distinct from the webpage operator and a message generator, the one or more information devices of the webpage user physically distinct from one or more information devices of a webpage operator and one or more information devices of a message generator, the checkout process configured to provide information to a fulfillment provider, the fulfillment provider a distinct entity from the webpage operator and the webpage user; and responsive to the webpage user following an instruction to initiate a purchase of a product, of the message generator, that is described by the message, the information sufficient to initiate fulfillment of the purchase, causing the information to be sent to the fulfillment provider;

the message created by the one or more information devices of the webpage operator via an automatic merger of a customized message content that corresponds to a message-generator-selected message identifier with a message template that corresponds to a message-generator-selected message template identifier, a message tag corresponding to the message-generator-selected message identifier defining where the customized message content appears in the automatically-created message, the message tag provided by the message generator, the message-generator-selected message identifier and the message-generator-selected message template identifier provided by the one or more information devices of the message generator to the one or more information devices of the webpage operator responsive to receipt of data gathered from the one or more information devices of the webpage user by the one or more information devices of the webpage operator, the customized message content a result of a modification by the one or more information devices of the webpage operator of a selected suggested message content from a plurality of suggested message contents provided to the one or more information devices of the webpage operator by the one or more information devices of the message generator, the message-generator-selected message template identifier one of a plurality of message template identifiers provided to the webpage operator by the message generator, the message generator a distinct party from the webpage operator, the one or more information devices of the message generator physically distinct from the one or more information devices of the webpage operator, each of the plurality of message template identifiers corresponding to a message template provided to the webpage operator by the message generator.

22. A method configured to cause an internet-based checkout process of a webpage operator to render, to a webpage user, message content of an advertisement, the message content selected by a message generator and customized by the webpage operator, the checkout process configured to sell any of a plurality of products of the webpage operator, the method comprising:

responsive to the webpage user initiating the checkout process for at least one product from the plurality of products of the webpage operator, automatically providing data obtained from one or more information devices of the webpage user to one or more information devices of the message generator;

automatically causing an automatically-created message to be rendered to the webpage user during the checkout process via the one or more information devices of the webpage user, and responsive to the webpage user following an instruction to initiate a purchase of a product, of a message generator, that is described by the automatically-created message, sending information to a fulfillment provider, the information sufficient to initiate fulfillment of the purchase, the automatically-created message created by one or more information devices of the webpage operator via an automatic merger of a customized message content that corresponds to a message-generator-selected message identifier with a message template that corresponds to a message-generator-selected message template identifier, a message tag corresponding to the message-generator-selected message identifier defining where the customized message content appears in the automatically-created message, the message tag provided by the message generator, the message-generator-selected message identifier and the message-generator-selected message template identifier automatically provided by one or more information devices of the message generator to the one or more information devices of the webpage operator responsive to receipt of the data obtained from the one or more information devices of the webpage user by the one or more information devices of the webpage operator, the customized message content a result of a modification by the one or more information devices of the webpage operator of a selected suggested message content from a plurality of suggested message contents provided to the one or more information devices of the webpage operator by the one or more information devices of the message generator, the message-generator-selected message template identifier one of a plurality of message template identifiers provided to the one or more information devices of the webpage operator by the one or more information devices of the message generator, each of the plurality of message template identifiers corresponding to a message template provided to the one or more information devices of the webpage operator by the one or more information devices of the message generator, each of the webpage user, the webpage operator, the message generator, and the fulfillment provider distinct from one another, each of the one or more information devices of the webpage user, the one or more information devices of the webpage operator, and the one or more information devices of the message generator physically distinct from one another.

\* \* \* \* \*